(12) United States Patent
Bugnet et al.

(10) Patent No.: US 8,982,262 B2
(45) Date of Patent: Mar. 17, 2015

(54) IMAGE SENSOR HAVING A SAMPLER ARRAY

(75) Inventors: Henri Bugnet, Moirans (FR); Alexandre Tatat, Gernoble (FR)

(73) Assignee: E2V Semiconductors, Saint-Égrève (FR)

( * ) Notice: Subject to any disclaimer, the term of this patent is extended or adjusted under 35 U.S.C. 154(b) by 109 days.

(21) Appl. No.: 13/696,242

(22) PCT Filed: May 4, 2011

(86) PCT No.: PCT/EP2011/057152
§ 371 (c)(1), (2), (4) Date: Nov. 5, 2012

(87) PCT Pub. No.: WO2011/138374
PCT Pub. Date: Nov. 10, 2011

(65) Prior Publication Data
US 2013/0050553 A1 Feb. 28, 2013

(30) Foreign Application Priority Data
May 4, 2010 (FR) ...................................... 10 01911

(51) Int. Cl.
*H04N 3/14* (2006.01)
*H04N 5/335* (2011.01)
*H04N 5/374* (2011.01)
*H04N 5/363* (2011.01)

(52) U.S. Cl.
CPC ............. *H04N 5/3743* (2013.01); *H04N 5/363* (2013.01)

USPC ......... 348/308; 348/295; 257/292; 250/208.1

(58) Field of Classification Search
USPC .................. 348/295, 308; 257/292; 250/208.1
See application file for complete search history.

(56) References Cited

U.S. PATENT DOCUMENTS
2008/0079830 A1 4/2008 Lepage

FOREIGN PATENT DOCUMENTS
| FR | 2906080 A1 | 3/2008 |
| WO | 9960777 A1 | 11/1999 |
| WO | 0126382 A1 | 4/2001 |

OTHER PUBLICATIONS
International Search Report.

*Primary Examiner* — Paul Berardesca
(74) *Attorney, Agent, or Firm* — Lowe Hauptman & Ham, LLP

(57) ABSTRACT

The invention relates to an image sensor with N rows of P active photosensitive pixels using MOS technology. The sensor comprises digitizing circuits organized with N rows of P processing circuits, each processing circuit of row rank i and of column rank j comprising a respective sampler for carrying out a correlated double sampling of the signals present on a column conductor of rank j and corresponding to the observation of an image dot over the same integration time for all the rows, and an analog-digital conversion means in order to supply digital values of the analog signals sampled. The sensor is particularly suited to operating in TDI (image scanning and integration) mode.

9 Claims, 4 Drawing Sheets

IMAGE SENSOR HAVING A SAMPLER ARRAY

The invention relates to image sensors, more particularly but not exclusively to TDI sensors (for 'Time Delay Integration linear sensors'), in which an image of a line of dots of an observed scene is reconstituted by addition of successive images taken by several photosensitive rows successively observing the same line of the scene as the scene passes in front of the sensor perpendicularly to the rows.

These sensors are used for example in systems for observation of the earth by satellite. They comprise several parallel rows of photosensitive pixels; the sequencing of the circuits controlling the various rows (control of exposure time then of reading the photogenerated charges) is synchronized with respect to the relative displacement of the scene and of the sensor, in such a manner that all the rows of the sensor see a single line of the observed scene. The signals generated are then added together dot by dot for each dot of the line observed.

The theoretical signal/noise ratio is improved in the ratio of the square root of the number N of rows of the sensor. This number can go from a few rows to a hundred or so depending on the applications (industrial control, earth observation, panoramic dental radiography or mammography).

In CCD image sensors (CCD: 'Charge-Coupled Device'), the addition of the signals dot by dot took place naturally and without read noise by transferring into a row of pixels the charges generated by the preceding row, in synchronization with the relative displacement of the scene and of the sensor.

In the patent application WO2008034794, an image sensor is provided based on CMOS technology, with active pixels, operating in TDI mode. There is no charge transfer from row to row since the active pixels do not operate by charge transfer but supply a voltage onto a column conductor. In order to perform the addition of the signals corresponding to the same image line seen by the various rows of pixels, an analog-digital conversion was used to supply a digital representation of the output of each pixel and N digital values coming from N pixels, which had successively seen the image dot during its passage, were added together. However, the principle described in this application did not allow a signal read to be carried out by true correlated double sampling but only by a pseudo-correlated double sampling with an accompanying noise of the kTC type which limits the possibilities of detection under low illumination conditions.

The aim of the invention is to correct this defect by allowing a read operation with a true correlated double sampling while at the same time allowing a common integration time for all the rows. For this purpose, if the sensor comprises N rows of P pixels read by successively addressing each row, then the sampling of the analog signals coming from these pixels is carried out by an auxiliary matrix with N rows of P individual processing circuits each comprising a respective sampling circuit; the P processing circuits of a row each receive as inputs one of the P column conductors so as to be able to sample row by row the signals coming from the pixels. Reset potential levels are successively placed row by row onto all the column conductors and sampled row by row in the N×P sampling circuits; then the useful signals, referenced with respect to the reset potential levels of each pixel, are placed row by row onto the column conductors and sampled row by row. The analog-digital conversion of the sampled signals and the digital summation of the converted signals can be carried out by the individual processing circuits.

Moreover, this type of organization allows an instantaneous matrix image sensor to be formed (in other words without image displacement and integration of charges, hence without summation) having the property of being able to operate both with an integration time common to all the rows and with a true correlated double sampling minimizing the correlated switching noise.

Consequently, according to one definition of the invention, a scanning image sensor with signal integration is provided here with N rows of P photosensitive pixels, a pixel of rank j in a row being formed by a circuit using MOS transistors comprising a row selection input connected to a row addressing conductor common to the pixels of the row and an output connected to a column conductor of rank j common to the N pixels of same rank j belonging to the various rows, the sensor comprising a circuit for successive addressing of each of the N rows of pixels so as to apply each time to the column conductors P, on the one hand, P reset potentials and, on the other hand, P analog signals corresponding to the integration of charges, over the same integration period T, in the P pixels of the row being addressed, and the sensor furthermore comprising signal digitizing circuits, characterized in that the digitizing circuits comprise:

N rows of P processing circuits, each processing circuit of rank i within a row and of rank j within a column comprising a respective sampler for carrying out a correlated double sampling of the signals present on a column conductor of rank j and corresponding to the observation of an image dot over the same integration time for all the rows, and an analog-digital conversion means in order to supply digital values of the analog signals sampled, a digital addition means for adding together a signal converted by the processing circuit of row rank i and column rank j and corresponding to an integration period T with digital signals converted by the processing circuits of preceding row ranks and corresponding to the observation of the same image dot over preceding periods of integration, and a means for extraction of the content from the digital addition means of the last row at the end of each integration period.

The sampler is configured to carry out a correlated double sampling comprising the sampling of a reset potential corresponding to the potential of a storage node of the pixel after resetting and the sampling of a useful potential corresponding to the potential of the storage node after transferring of charges into the storage node, in which the reset potential corresponds to an emptying of charges from the storage node and the useful signal level corresponds to a refilling of charges into the storage node following this emptying. The sampler forming part of a processing circuit then preferably comprises means for firstly storing a reset potential level following a reset pulse applied to the reset transistor of a pixel, then a signal level following a transfer pulse applied to the transfer transistor; the analog-digital conversion means then converts the difference between these two levels. The reset pulse and the transfer pulse are common to all the pixels of the N rows.

In one preferred embodiment, each pixel is an active pixel using MOS technology and comprises a photodiode, a storage node for charges, a transfer transistor in order to allow the transfer of charges from the photodiode to the storage node, a reset transistor for resetting the potential of the storage node, a follower transistor for generating a potential representing the quantity of charges in the storage node, and a row selection transistor for connecting the follower transistor to the column conductor.

The sensor comprises means for emitting a common reset signal (RST) for simultaneously turning on all the reset transistors of the matrix, means for emitting a common transfer signal (GTRA) for simultaneously turning on all the transfer transistors of the matrix, means for successively controlling for each of the rows the sampling of a reset potential after a common reset command and prior to a common transfer command, then for successively controlling for each of the rows the sampling of a useful potential after the transfer command.

The digital addition means of a processing circuit of row rank i and column rank j is preferably connected to an output from a processing circuit of preceding row rank i−1 so as to receive from it the result of a digital addition carried out during a preceding integration; the digital addition means is designed to add to this result a digital value resulting from a current analog-digital conversion.

The analog-digital conversion means and the means for adding the digital values are preferably distributed within the various processing circuits, and the sensor then comprises an output circuit for extracting from at least one of the N rows of P processing circuits the result of the additions carried out in each of the pixels of this row.

Physically, the sensor comprises a juxtaposition of a matrix of photosensitive pixels with four transistors per pixel, and a matrix of processing circuits situated outside of the matrix of pixels.

In one preferred embodiment, the same row addressing circuit can be used both for the addressing of the rows of pixels and for the addressing of the processing circuits in order to allow the sampling of the signals coming from a row of pixels of rank i again in the row of processing circuits of rank i. In this case, the result of the additions is systematically extracted from the last row of processing circuits.

The analog-digital conversion means is preferably a ramp converter comprising a comparator and a counter in each processing circuit, the counter counting at a fixed rate up to the switching of the comparator when a linear voltage ramp is applied onto an input of the comparator. The counter is incremented in proportion to the sampled signal to be converted. The digital addition means is then a reset input of the counter designed to initialize the counter at a value supplied by the processing circuit of preceding rank.

The output of the counter of an auxiliary circuit of row rank i and of column rank j is then connected to an input of the counter of a processing circuit of row rank i+1 and column rank j in order to place in the latter, prior to an analog-digital conversion corresponding to an integration period, a result corresponding to the row of rank i and to a preceding integration period.

The counter of a digitization circuit of column rank j and of row rank i comprises a reset input connected to the output of the counter of same column rank and of preceding row rank, so as to initialize the counter of column rank j and row rank i with the result contained in the counter of same rank within a column and of preceding row rank i−1 before the start of an analog-digital conversion. The result of this is that the content of the counter of the circuit of rank i at the end of the ramp corresponds to the addition of the quantity of light received by a pixel and of the preceding content supplied by the counter of rank i−1, which itself comes from a preceding addition and so on.

Other characteristics and advantages of the invention will become apparent upon reading the detailed description that follows and which is presented with reference to the appended drawings in which.

Figure 1:
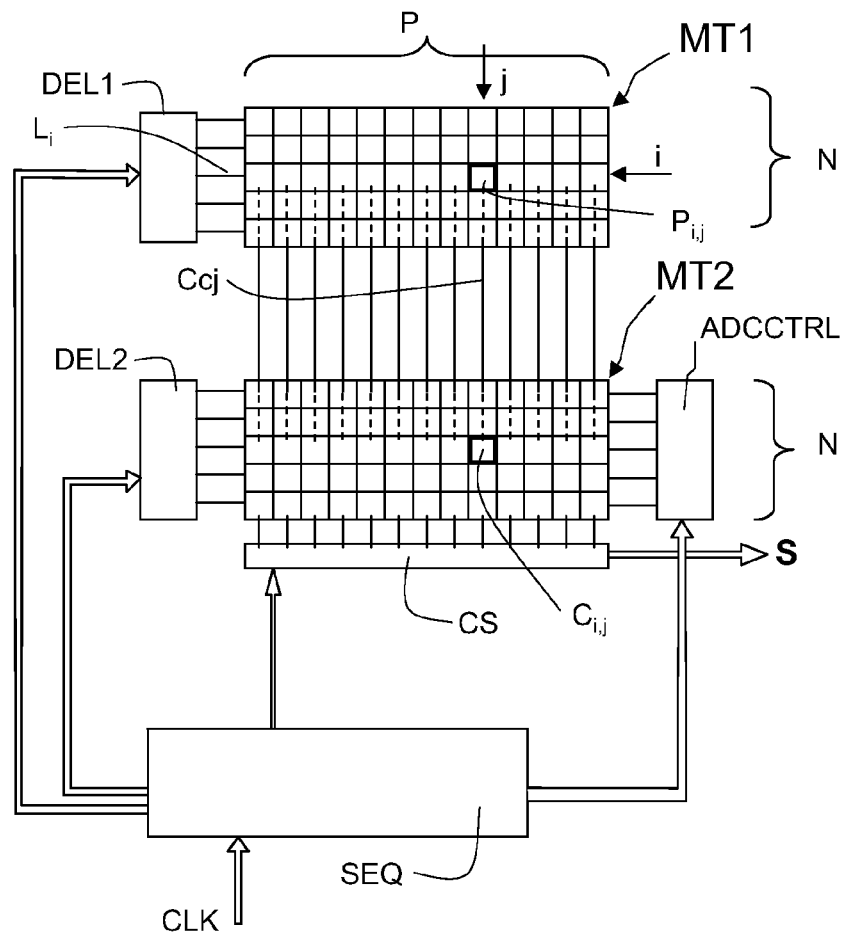
FIG. 1 shows the general architecture of the sensor according to the invention.

In FIG. 1, the general architecture can be seen of a scanning digital image sensor with integration of charges according to the invention. The sensor comprises a matrix MT1 of N rows of P pixels sensitive to light. Each of the N rows successively sees the same image line during the displacement of the image with respect to the sensor, and the signals of the N rows are added together synchronously pixel by pixel. The pixels are pixels of the CMOS type each generally comprising a photodiode and a few transistors. The pixels of the same row of rank i (i=1 to N) are connected to the same conductor of row $L_i$ which allows all the pixels of the row to be simultaneously addressed. The pixels of a column of rank j (j=1 to P) are all connected to the same column conductor Ccj. When the row $L_i$ is addressed, each pixel $P_{i,j}$ of this row is connected to the corresponding column conductor $Cc_j$ in order to apply to it an analog signal representing the illumination of the pixel $P_{i,j}$ over a given integration time T. For this purpose, the row conductors $L_i$ receive signals for addressing a row decoder DEL1. The column conductors Ccj form output conductors from the matrix of pixels MT1.

A second matrix MT2 of M rows of P processing circuits is associated with the matrix of pixels MT1 and has as inputs the column conductors $Cc_j$. Each processing circuit $C_{i,j}$ of row rank i and column rank j comprises an elementary sampler-blocker. The samplers-blockers are connected to the column conductors $Cc_j$ so as to receive from them analog signals to be sampled. The samplers-blockers are addressed in a row by row conductors coming from a row decoder DEL2 and it is the samplers-blockers of the row addressed and these alone which receive the analog signals present on the column conductors. As will be seen, in certain cases, the decoder DEL2 can be the same as the decoder DEL1; but the decoders are separate in the cases where the row of samplers has to receive potential levels which come at each new integration period from a different row of pixels.

Preferably, the cells $C_{i,j}$ each comprise not only a respective sampler-blocker but also an elementary analog-digital converter and an elementary summing means.

An output circuit CS comprising P output cells (as many as the columns) allows digital signals to be extracted from the matrix MT2 which are the results of several additions of elementary signals obtained by successive observations of the same image line by several rows of the matrix MT1. The results for this image line, extracted from the matrix MT2, can be read on an output S. The output is generated for example in series mode, the P cells each successively supplying a digital signal on the output S; the results for the next image line are extracted periodically after a time T equal to the integration time.

The sampling and analog-digital conversion functions for the row addressed in the matrix MT2 are controlled by a control circuit ADCCTRL. The general sequencing of the operation of the sensor is provided by a sequencing circuit SEQ.

Two types of general sequencing can be provided for carrying out the digital accumulation of the signals from the same image line seen successively by the N rows of pixels of the matrix MT1. One of the sequencing procedures uses a circular permutation for the transmission of analog signals from a row of the matrix MT1 to a row of the matrix MT2 and a circular permutation for the transmission from a row of the matrix MT2 to the output circuit CS. The other, preferred, type does not use a circular permutation. When there is a sequencing with circular permutation, a decoder DEL2 is needed for addressing the rows of the matrix MT2 differently from the addressing of the rows of the matrix MT1 and for designating a row from amongst N in circular permutation for extracting its content to the output circuit CS.

The preferred sequencing, without permutation, will now be described in detail.

An image line is seen by the first row of pixels (rank i=1) over an integration time T. The analog content of this row is transferred into the first row (rank i=1) of the matrix MT2, sampled and converted into digital, and stored in this row.

Then, after displacement by a distance increment corresponding to the period T, this same image line is seen by the second row (i=2) of the matrix MT1. This second row is transferred into the second row of the matrix MT2, sampled, converted, and added to the content previously stored in the first row (i=1). During this time, the first row of pixels of the matrix MT1 sees a second image line and the content of this first row is again transferred into the first row of the matrix MT2.

The process continues in this way, each row of rank i of the matrix of pixels is transferred at each new integration period into the row of the same rank i of the matrix MT2; it is sampled, converted, and added to the preceding content of the row of rank i−1.

At the end of the $N^{th}$ integration period, in other words after a time N×T, the last row of the matrix, of rank N, contains the addition of the signals corresponding to the first image line seen by the N rows of the matrix MT1.

The output circuit extracts the content of the $N^{th}$ row of the matrix MT2 and resets this content to zero.

At the end of the $(N+1)^{th}$ period, the last row of the matrix MT2 contains the addition of the signals corresponding to the second image line seen by the N rows of the matrix. This content is extracted and reset to zero, etc.

There is not therefore any circular permutation of the addressing for the storage in the matrix MT2: the transfer always occurs from the row i of the matrix MT1 to the row i of the matrix MT2; nor is there any circular permutation for the extraction of the signals from the matrix MT2: the extraction always occurs from the row N; in contrast to this simplification in addressing, there is the necessity to systematically transfer into a row of any given rank i of the matrix MT2 the content previously stored in the row of rank i−1. This transfer occurs with a period equal to the integration time T. This takes place prior to each new analog-digital conversion and the content transferred (resulting from the preceding integration period) is added to the result of the current analog-digital conversion.

Timing Diagram of the Sampling Signals:

Whatever the type of sequencing for the accumulation of digital signals from N rows of the matrix of pixels, thanks to the invention a CMOS pixel with four or five transistors can be used operating with an integration time which starts at the same time for all the rows of pixels and which also ends at the same time for all the rows. In addition, the timing diagram that will be detailed allows a true correlated double sampling to be carried out.

It is recalled that double sampling consists in sampling separately a reset level and a useful signal level. True correlated double sampling consists in resetting the potential of a node for storing charges (in the pixel) then in sampling the reset level, then in transferring into the storage node the charges integrated by a photodiode over an integration time T, then in sampling the resulting useful signal level, and finally, in taking the difference between the two sampled signals. Pseudo-correlated double sampling would consist in firstly transferring into the storage node the charges integrated over the time T, then in sampling the useful signal level, then in resetting the storage node, then in sampling the reset level, and finally, in taking the difference between the two sampled signals. However, in the second case, the comparison uses the reset level which will be used for the following integration period, not that of the period underway and this is the reason why it is not considered as a true correlated double sampling. Although, in principle, the reset level is the same at each period, there is switching noise of the kTC type which is due to the reset transistor, which noise is not eliminated with pseudo-correlated double sampling.

It is important to note that the usual matrices of pixels with four or five transistors allow a true correlated double sampling, but only if they operate in a mode referred to as 'rolling shutter mode', in other words a mode in which the integration times are distributed step-wise over the various rows and not common to all the rows. Pixels with five transistors usually allow an integration time common to all the rows; however, in this case, they do not allow a true correlated double sampling to be performed but only a pseudo-correlated double sampling. According to the invention, it is possible to operate with four transistors (an optional fifth transistor may be provided in order to reduce the exposure time) both with an integration time common to all the rows and a true correlated double sampling.

Figure 2:
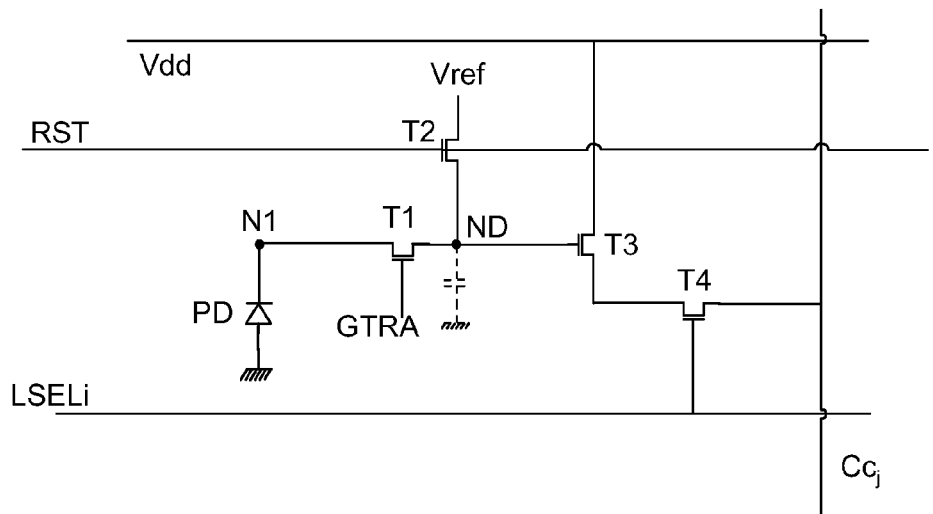
FIG. 2 shows a circuit diagram of a CMOS pixel with four transistors.

FIG. 2 shows the structure of an active pixel using CMOS technology with four transistors T1 to T4 and a photodiode PD; the node N1 represents the cathode of the photodiode; it collects the charges generated by the light in the photodiode; a transfer transistor T1 connects the node N1 to a node ND for storage of charges; the transistor T1 is only turned on for a brief period of time by a transfer signal GTRA which allows the charges accumulated in the photodiode after an integration time T to be transferred from the photodiode to the node ND. The transfer signal GTRA is common to all the pixels of the matrix.

The storage node for charges ND can be reset to a reference potential Vref by a reset transistor T2 in order to empty the charges accumulated in the node ND during a preceding integration period and consequently to bring this node to a reset potential. For this purpose, the transistor T2 is made to conduct for a brief period by a reset signal RST common to all the pixels of the matrix.

The storage node ND is furthermore connected to the gate of a follower transistor T3 whose drain is at the reference potential Vref (or another fixed potential such as a power supply voltage Vdd) and whose source matches (to within a gate-source voltage drop) the potential assumed by the gate, in other words the potential of the storage node ND. The source of the follower transistor T3 is connected, by means of a row selection transistor T4, to a column conductor Ccj common to all the pixels of a column of rank j. The row selection transistor T4 is made to conduct by a signal $LSEL_i$ which is an addressing signal for the row of rank i and which is common to all the pixels of this row. There are N row selection signals $LSEL_1$ to $LSEL_N$.

Figure 3:
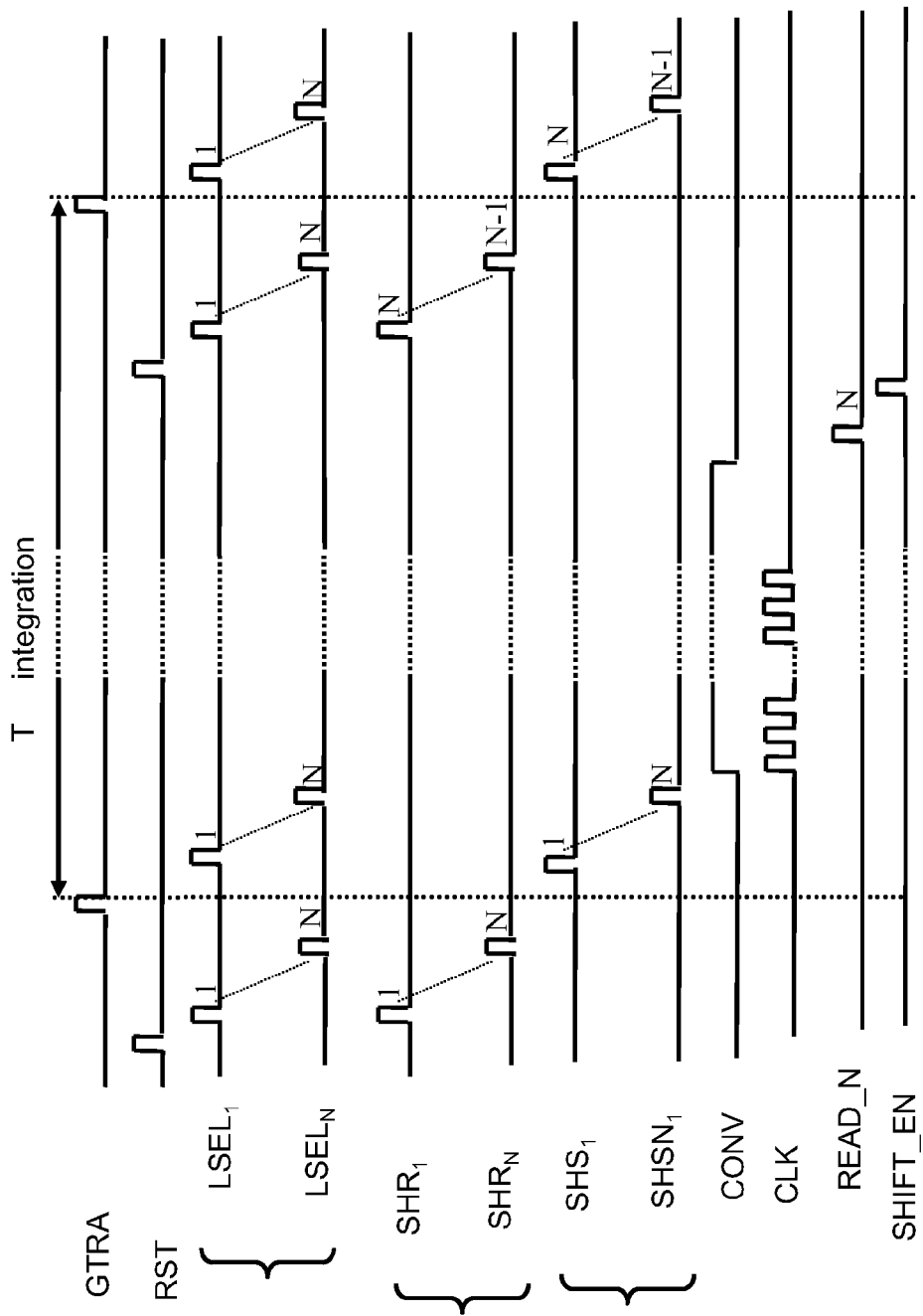
FIG. 3 shows an operational timing diagram of the sensor.

The timing diagram used in the invention is shown in FIG. 3.

A brief reset signal RST is emitted; this is common to all the pixels of the matrix. It brings the storage nodes of all the pixels to a reset potential level.

Then, the row 1 of the matrix of pixels MT1 and the row 1 of the matrix MT2 are selected by the signal $LSEL_1$; the reset levels of the storage nodes of the pixels of the row 1 are applied to the column conductors which connect the matrix MT1 to the matrix MT2; these reset levels are then sampled in the samplers-blockers of the row 1 of the matrix MT2, by means of a sampling signal $SHR_1$ common to all these samplers-blockers of the row 1.

Subsequently, all the rows are successively selected one after the other by signals $LSEL_2$ à $LSEL_N$ and, during the selection of a row, each time the corresponding reset levels in the corresponding row of the matrix MT2 are sampled. Thus, a first sampling signal $SHR_i$ specific to the row i of the matrix MT2 allows the reset levels coming from the pixels of the row of the same rank i of the matrix MT1, addressed by the selection signal $LSEL_i$, to be sampled in this row of rank i.

At the end of this initial sequence, each sampler-blocker of the matrix MT2 contains a reset level of a respective pixel of the matrix MT1.

A brief transfer signal GTRA which defines the end of an integration time T (and the start of the following period) is then applied to the whole matrix MT1. The storage nodes ND of the pixels receive quantities of charges corresponding to their respective illumination during the preceding integration time. These charges are supplied by the photodiodes which are completely emptied and are ready for a new integration time.

All the rows are once again successively selected one after the other, in the matrix MT1 and at the same time in the matrix MT2, by signals $LSEL_1$ to $LSEL_N$ and the corresponding levels of useful signal are sampled each time. A second sampling signal SHS, specific to the row i of the matrix MT2 allows the levels of useful signal coming from the pixels of the row i of the matrix MT1, addressed by the selection signal $LSEL_i$, to be sampled in the row of the same rank i of the matrix MT2.

At the end of this sequence, each sampler-blocker of the matrix MT2 contains, aside from a previously stored reset level, a useful signal level of a respective pixel of the matrix MT1. The reset level is indeed that which precedes the refilling of the storage node and not that which follows this refilling and a true correlated double sampling can be carried out.

The analog-digital conversion performed in the processing circuit $C_{i,j}$ of the matrix MT2 supplies a digital value of the difference between the useful signal level and the reset level for each pixel. This conversion is carried out simultaneously for all the pixels. It is carried out during the integration time after the last sampling of useful signal $SHS_N$ and prior to the emission of a new global reset signal on the row RST. The interval of time used for the analog-digital conversion is symbolized by a high pulse CONV in FIG. 3. If the conversion is done with the aid of a counter as will be explained hereinbelow, the counter counts at the frequency of a clock CLK for a period of time which depends on the value to be converted. The result of the conversion is read at the end of this time.

The result of the conversion is added either to a result previously stored in the same processing circuit $C_{i,j}$ of the matrix MT2 or to a result previously stored in the circuit $C_{i-1,j}$ of the same rank j in the preceding row depending on the mode of sequencing that is adopted. It is considered here that the sequencing is without circular permutation and it is the second case that is applied.

In the case where the conversion uses a counter for supplying the result of the conversion, the reading of the content of the counter preferably consists in transferring the output of the counter to a reset input of the counter of the same rank j in the next row so that this counter starts from an initial non-zero content during the next integration period. After the end of the digital conversion, a high pulse SHIFT_EN symbolizes the fact that the final content of a counter is shifted toward a reset input of the counter of the next row. As far as the first row is concerned, its initial content is systematically set to zero.

However, after the end of the analog-digital conversion CONV and prior to the emission of the content transfer pulse SHIFT_EN, the content of the last row of counters is read (read pulse READ_N), which contains the integration result sought.

Figure 4:
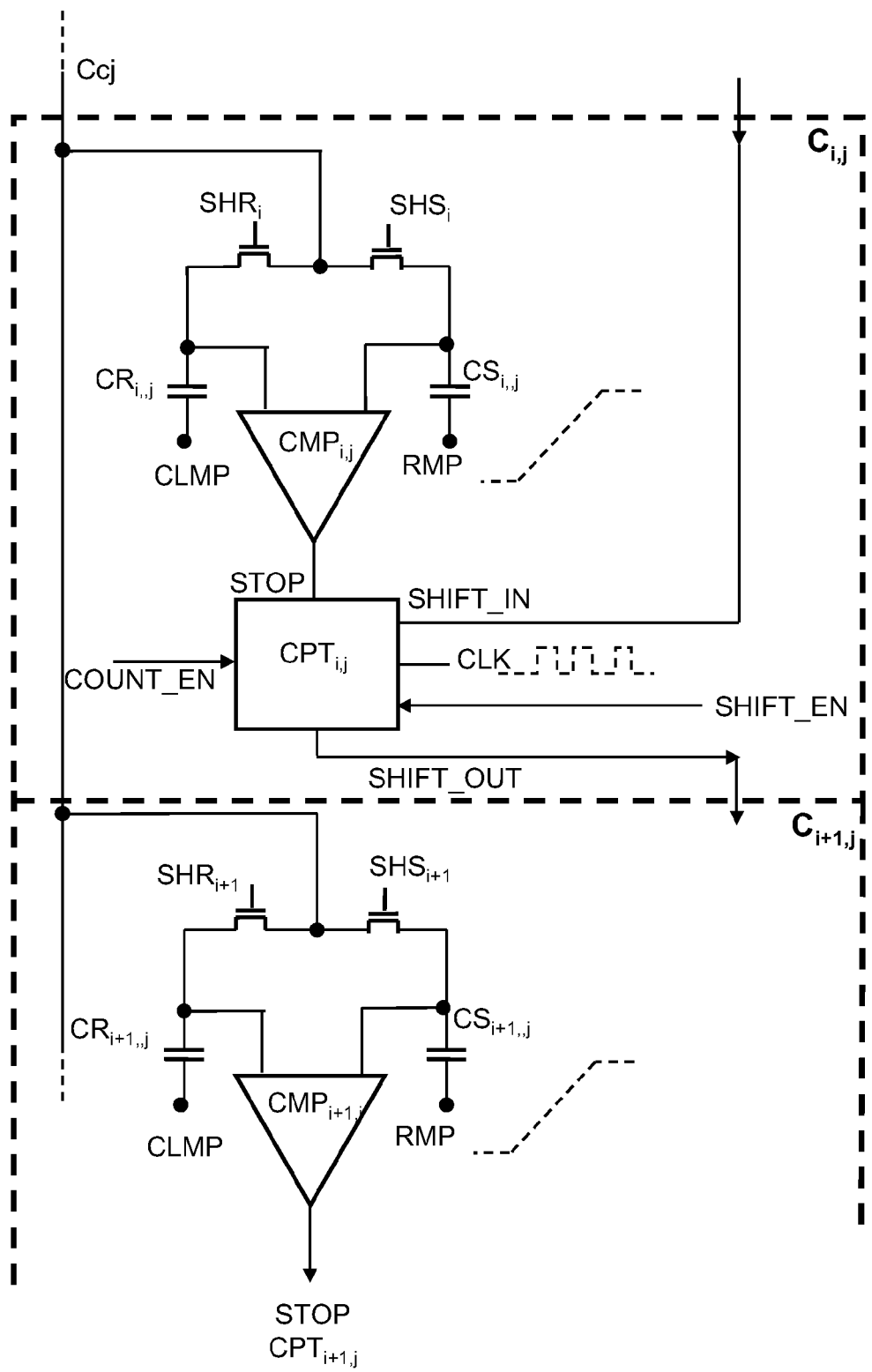
FIG. 4 shows the basic structure of a processing circuit of rank i,j.

FIG. 4 shows the basic circuit diagram of a processing circuit $C_{i,j}$ of rank j in the row i of the matrix MT2, using an individual ramp analog-digital converter in the processing circuit itself. The converter uses a counter $CPT_{i,j}$, a comparator $CMP_{i,j}$, and a linear voltage ramp which is common to the whole matrix MT2.

The sampler-blocker of rank i,j in this example comprises two storage capacities $CR_{i,j}$ and $CS_{i,j}$, the first for storing a reset level present on the column conductor Ccj at the time of the first sampling signal $SHR_i$, the second for storing a useful signal level present on this same conductor at the time of the second sampling signal $SHS_i$.

The first capacitor $CR_{i,j}$ has a terminal at a reference potential CLMP. The second capacitor $CS_{i,j}$ has a terminal connected to a terminal RMP which receives a voltage ramp (in principle linear) from a ramp generator (not shown) starting from the potential CLMP. The counter $CPT_{i,j}$ counts at a constant frequency supplied by a clock CLK common to the whole matrix.

The counter begins to count at the same time as the ramp begins to climb. A control signal COUNT_EN defines the start of the conversion (CONV in FIG. 3) and is used both to trigger the counting by the counter and the start of the ramp. The stopping of the counter is triggered by a signal STOP coming from the output of the comparator. When the level of the ramp is such that the potentials on the two inputs of the comparator become identical, the comparator $CMP_{i,j}$ switches and interrupts the counting. The content of the counter at the time it is stopped is proportional to the time taken by the ramp to reach a certain level and this time is proportional (if the ramp is linear) to the difference between the useful signal stored in the capacitor $CS_{i,j}$ and the reset signal stored in the capacitor $CR_{i,j}$. The potential of the useful signal is more negative than the reference potential CLMP and a rising voltage ramp is used. A falling ramp could be applied to the foot of the other capacitor.

The counter comprises a clock input (CLK), a start input COUNT_EN, a counting stop input (STOP), an input SHIFT_IN for receiving an initial content (this would be a zero reset input in the case of the sequencing with circular permutation), an input SHIFT_EN for authorizing the loading of the initial content, and finally, an output SHIFT_OUT which supplies the content of the counter to the counter of the next row. For the last row, the output SHIFT_OUT supplies to the output circuit CS the result of the accumulation of N views of the same image line. For the first row, the input SHIFT_IN receives a zero reset value of the counter since the first row must be reset to zero prior to each new conversion in the case of a sequencing without circular permutation.

Figure 5:
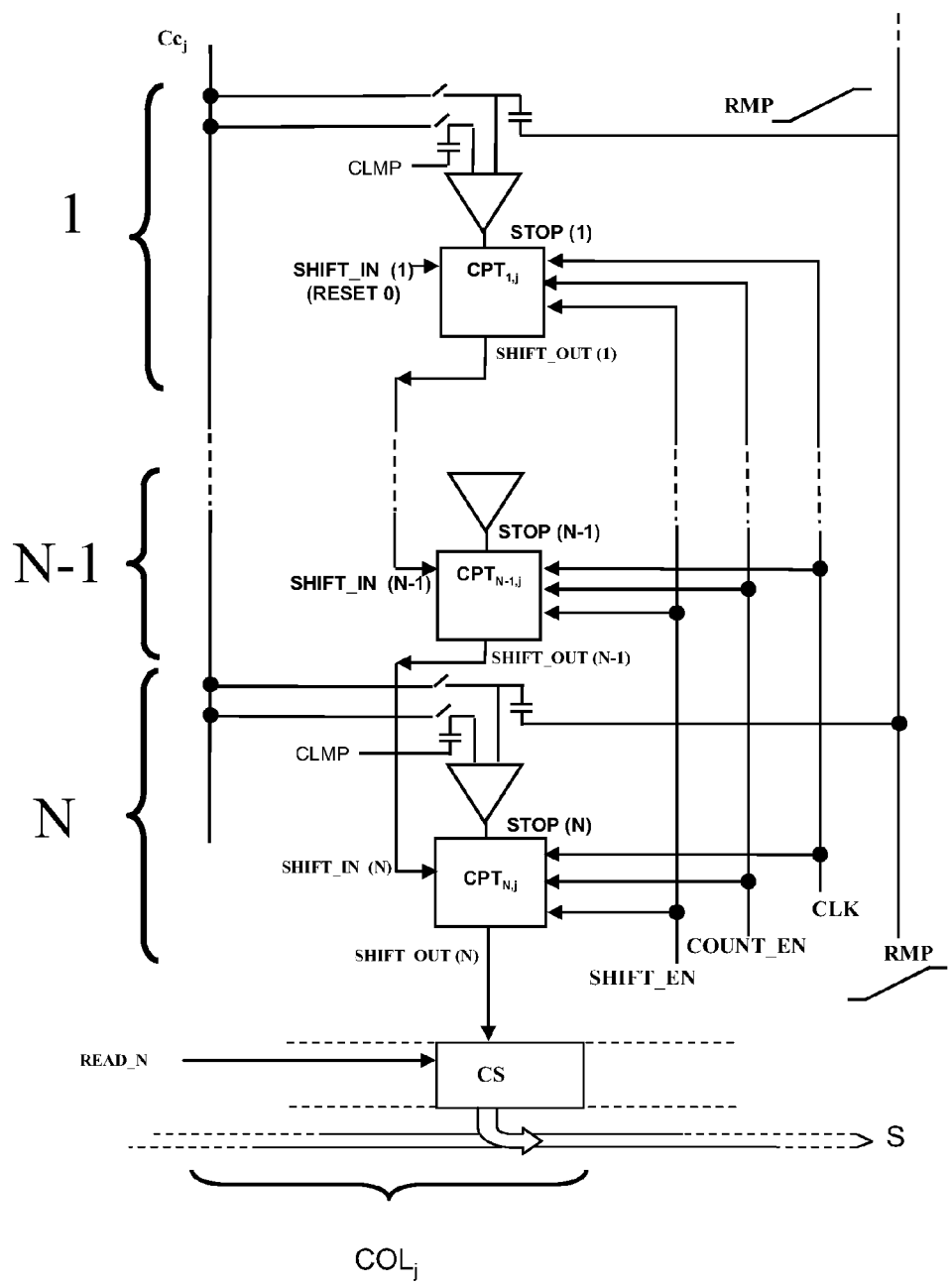
FIG. 5 shows the overall connection structure of the processing circuits in the same column in the case where these circuits are connected together for adding together the result of the preceding row and a new analog-digital conversion.

FIG. 5 shows the general organization of the matrix MT2 when the analog-digital conversion is done in this way.

It will be noted that an important advantage of this image sensor is that it can be used as an instantaneous image sensor (not operating in signal scanning and integration mode) capable of operating both with an integration time common to all the rows of the matrix and a true correlated double sampling. In this case, it is understood that the means of digital summation and of permutation do not have to be present and it is sufficient to extract from the matrix MT2 the totality of the digitized signals at the end of each sampling period of duration T, by using the timing diagram in FIG. 3 but by reading all the rows of the matrix MT2 and not only the row of rank N. Of course, in this case, there is no permutation of addressing and the row of rank i of the matrix MT1 is systematically sampled in the row of the same rank of the matrix MT2.

When the image sensor operates in scanning and charge integration mode, it is noted that the same image line is read and converted successively by all the samplers-blockers and all the analog-digital converters of the matrix MT2, in such a manner that notably the offset errors of the comparators used in the conversion are averaged over N rows.

The invention claimed is:

1. A scanning image sensor with signal integration, having N rows of P photosensitive pixels, a pixel of rank j in a row being formed by a circuit using MOS transistors comprising a row selection input connected to a row addressing conductor common to pixels of the row and an output connected to a column conductor of rank j common to the N pixels of same rank j belonging to the various rows, the sensor comprising a circuit for successive addressing of each of the N rows of pixels so as to apply each time to the column conductors, on the one hand, P reset potentials and, on the other hand, P analog signals corresponding to the integration of charges, over the same integration period T, in the P pixels of the row being addressed, and the sensor furthermore comprising signal digitizing circuits, wherein the digitizing circuits comprise, outside the matrix of N rows of P pixels, N rows of P processing circuits, each processing circuit of row rank i and of column rank j comprising:
 a respective sampler for carrying out a correlated double sampling of the signals present on a column conductor of rank j and corresponding to the observation of an image dot over the same integration duration for all the rows, and
  an analog-digital converter configured to supply digital values of the analog signals sampled,
  a digital addition means for adding together a signal converted by the processing circuit of row rank i and column rank j and corresponding to an integration period T with digital signals converted by the processing circuits of preceding row ranks and corresponding to the observation of the same image dot over preceding periods of integration,
 wherein
 the analog-digital converter in a processing circuit of rank i, k is a ramp converter comprising a comparator and a counter of rank i, k, the counter counting at a fixed rate up to the switching of the comparator when a linear voltage ramp is applied onto an input of the comparator, and
 the digital addition means in a processing circuit of rank i, k is an initialization input of the counter of rank i, k, said initialization input connected to an output of a counter of preceding rank i−1, k and configured to initialize the counter of rank i, k at a value supplied by said counter of preceding rank i−1, k, prior to an analog-digital conversion, so that a content of the counter of rank i, k at an end of an integration period is the accumulation of a previous accumulated value in said counter of preceding rank i−1, k and a current conversion value computed by the counter of rank i, k.

2. The image sensor as claimed in claim 1, wherein the sampler is configured to carry out a correlated double sampling comprising the sampling of a reset potential of a storage node of the pixel after resetting and the sampling of a useful signal level for this pixel, corresponding to the potential of the storage node after transferring of charges into the storage node, in which the reset level corresponds to an emptying of charges from the storage node and the useful signal level corresponds to a refilling of charges into the storage node subsequently to this emptying.

3. The image sensor as claimed in claim 2, wherein the reset level is defined by a reset pulse and the integration time is defined by a pulse for transfer of charges to the storage node, the reset pulse and the transfer pulse being common to all the pixels of the N rows.

4. The image sensor as claimed in claim 1, wherein each pixel comprises a photodiode, a storage node for charges, a transfer transistor to allow the transfer of charges from the photodiode to the storage node, a reset transistor for resetting the potential of the storage node, a follower transistor for generating a potential representing the quantity of charges in the storage node, and a row selection transistor for connecting the follower transistor to the column conductor.

5. A sensor as claimed in claim 4, further comprising:
 conductors connected to reset transistors of the matrix for receiving from a sequencer a common reset signal for simultaneously turning on all the reset transistors of the matrix,
 conductors connected to transfer transistors of the matrix for receiving from the sequencer a common transfer signal for simultaneously turning on all the transfer transistors of the matrix, and
 a control circuit for successively controlling for each of the rows the sampling of a reset potential after a common reset command and prior to a common transfer command, then for successively controlling for each of the rows the sampling of a useful potential after the transfer command.

6. The image sensor as claimed in claim 2, wherein each pixel comprises a photodiode, a storage node for charges, a transfer transistor to allow the transfer of charges from the photodiode to the storage node, a reset transistor for resetting the potential of the storage node, a follower transistor for generating a potential representing the quantity of charges in the storage node, and a row selection transistor for connecting the follower transistor to the column conductor.

7. A sensor as claimed in claim 6, further comprising:
 conductors connected to reset transistors of the matrix for receiving from a sequencer a common reset signal for simultaneously turning on all the reset transistors of the matrix,
 conductors connected to transfer transistors of the matrix for receiving from the sequencer a common transfer signal for simultaneously turning on all the transfer transistors of the matrix,
 a control circuit for successively controlling for each of the rows the sampling of a reset potential after a common reset command and prior to a common transfer command, then for successively controlling for each of the rows the sampling of a useful potential after the transfer command.

8. The image sensor as claimed in claim 3, wherein each pixel comprises a photodiode, a storage node for charges, a transfer transistor to allow the transfer of charges from the photodiode to the storage node, a reset transistor for resetting the potential of the storage node, a follower transistor for generating a potential representing the quantity of charges in the storage node, and a row selection transistor for connecting the follower transistor to the column conductor.

9. A sensor as claimed in claim 8, further comprising:
conductors connected to reset transistors of the matrix for receiving from a sequencer a common reset signal for simultaneously turning on all the reset transistors of the matrix,
conductors connected to transfer transistors of the matrix for receiving from the sequencer a common transfer signal for simultaneously turning on all the transfer transistors of the matrix,
a control circuit for successively controlling for each of the rows the sampling of a reset potential after a common reset command and prior to a common transfer command, then for successively controlling for each of the rows the sampling of a useful potential after the transfer command.

\* \* \* \* \*